United States Patent [19]
Malone et al.

[11] Patent Number: 5,491,708
[45] Date of Patent: Feb. 13, 1996

[54] INTEGRATED OPTIC LASER

[75] Inventors: Kevin J. Malone, Boulder, Colo.; Joseph S. Hayden, Clarks Summit, Pa.; Norman A. Sanford; John A. Aust, both of Boulder, Colo.

[73] Assignee: The United States of America as represented by the Secretary of Commerce, Washington, D.C.

[21] Appl. No.: 189,553

[22] Filed: Feb. 1, 1994

Related U.S. Application Data

[63] Continuation-in-part of Ser. No. 11,653, Feb. 1, 1993, Pat. No. 5,334,554.

[51] Int. Cl.$^6$ .............. H01S 3/16; G02B 6/00; C03C 15/00; C03B 27/00
[52] U.S. Cl. .......... 372/41; 385/132; 385/142; 501/48; 252/301.4 P; 65/30.13; 65/116
[58] Field of Search .............. 372/41; 385/141, 385/142, 132; 501/48; 252/301.4 P; 65/30.13, 116

[56] References Cited

U.S. PATENT DOCUMENTS

| | | | |
|---|---|---|---|
| 4,756,733 | 7/1988 | Houde-Walter et al. | 65/30.13 |
| 4,844,724 | 7/1989 | Sakai et al. | 65/30.13 |
| 4,875,920 | 10/1989 | Myers | 65/30.13 |
| 4,993,034 | 2/1991 | Aoki et al. | 372/40 |
| 5,078,772 | 1/1992 | Asahara et al. | 65/30.13 |
| 5,080,503 | 1/1992 | Najafi et al. | 385/1 |
| 5,334,559 | 8/1994 | Hadyn et al. | 501/108 |

OTHER PUBLICATIONS

Sanford et al., Optics Letters, vol. 16, No. 14, pp. 1095–1097 (Jul. 15, 1991).
Chen et al., *Integrated Optical Circuits and Components*, L. D. Hutcheson, ed., Marcel Dekker, Inc., New York, pp. 70–76 (1987) No month Available.
Sanford et al., Optics Letters, vol. 18, No. 4, pp. 281–283 (Feb. 15, 1993).
Malone et al., Electronics Letters, vol. 29, No. 8, pp. 691–692 (Apr. 15, 1993).
Araujo, Applied Optics, vol. 31, No. 25, pp. 5221–5224 (Sep. 1, 1992).
Findakly, Optical Engineering, vol. 24, No. 2, pp. 244–250 (Mar./Apr. 1985).
Malone et al., "Integrated Optic Laser Emitting at 905, 1057, and 1356 nm," Optical Society of America (OSA), Advanced Solid State Laser Conference, New Orleans, Louisiana (Feb. 1, 1993).

*Primary Examiner*—Rodney B. Bovernick
*Assistant Examiner*—Robert McNutt
*Attorney, Agent, or Firm*—Millen, White, Zelano & Branigan

[57] ABSTRACT

A laser waveguide medium is provided comprising:

a laser glass substrate wherein the substrate is a glass comprising (on an oxide composition basis):

| | Mole % |
|---|---|
| $P_2O_5$ | 50–70 |
| $Al_2O_3$ | 4–13 |
| $Na_2O$ | 10–35 |
| $La_2O_3$ | 0–6 |
| $Ln_2O_3$ | >0–6 |
| R'O | 0–20 |
| $R_2O$ | 0–18 | wherein $Ln_2O_3$ is the sum of the oxides of active lasing lanthanides of atomic numbers 58–71, R'O is the sum of oxides of Mg, Ca, Cr, Ba, Zn and Pb, and $R_2O$ is the sum of oxides of Li, K, Rb and Cs; and a waveguide region embedded in the substrate, the waveguide region having a higher refractive index than the substrate and the waveguide region having an inlet region through which light can enter and an outlet region through which light can exit.

37 Claims, 5 Drawing Sheets

INTEGRATED OPTIC LASER

CROSS REFERENCE TO RELATED APPLICATION

This application is a continuation-in-part of Ser. No. 08/011,653, filed Feb. 1,1993, now U.S. Pat. No. 5,334,559 the entire disclosure of which is hereby incorporated by reference.

BACKGROUND OF THE INVENTION

The invention relates to a laser waveguide medium which can be used as a laser waveguide, in particular a laser channel waveguide, to provide light amplification of laser oscillation. The invention further relates to a waveguide laser containing a laser waveguide medium, a method of manufacturing a laser waveguide medium, as well as a method of generating light amplification or laser oscillation using a laser waveguide medium.

Integrated optical circuitry is a rapidly growing field of technology having benefits in such areas as signal processing, computers, sensors, spectroscopy and communications. Integrated optical circuits, as the name implies, provide for the integration of multiple optical components on a single substrate. For example, an integrated optical circuit (IOC) can comprise a laser, switches, polarizers, detectors, etc. IOC's are used, for example, in optical data processing and optical sensing, as well as optical communications. See *Integrated Optical Circuits and Components: Design and Applications*, edited by L. D. Hutchenson (1987).

The use of miniature solid-state lasers such as diode pump solid-state lasers and fiber lasers in integrated optics is known. The miniature diode pumped solid-state lasers are small, compact and lightweight lasers in which a monolithic block of solid active laser material, usually crystalline, is pumped using a diode as the pump light source. A typical material for such a compact solid state laser is neodymium-doped YAG (yttrium aluminum garnet). This laser system emits at 1064 nm. Fiber laser systems, on the other hand, typically contain erbium-doped silica-based fibers which are produced by CVD processes. These fiber laser systems generally operate at a wavelength of about 1.54 µm. Neodymium-doped fibers that lase at 1060 nm have also been demonstrated. Due to spectroscopic limitations, light amplification at 1.3 µm is not possible in silica optical fiber laser systems. Light amplification at 1310 nm has been achieved in praseodymium-doped heavy metal fluoride optical fibers. This glass is known as ZBLAN. Light amplification around 1410 nm has been achieved in neodymium-doped phosphate fibers. Also, light amplification and lasing has been achieved in neodymiumdoped LiYF$_4$ (Nd:YLF) at 1315 nm.

Light amplification in the region of 1.3 µm is particularly desirable for miniature solid-state laser oscillators and amplifiers for telecommunication applications. The vast majority of optical fiber communication systems operate near this wavelength.

There are two primary wavelengths that are used for optical fiber telecommunications, 1.3 µm and 1.55 µm. The 1.55 µm band is used for undersea optical fiber links because silica optical fibers have their lowest attenuation at that wavelength. The 1.3 µm band is used because silica optical fibers have their lowest dispersion at that wavelength. That means that very high bandwidth signals can be transmitted at this wavelength without the pulse broadening caused by dispersion. Detectors that operate at these wavelengths are made from Group III–V materials such as InGaAs. These detectors, as well as the laser sources, are costly to manufacture. Silicon detectors are much less expensive to produce than Group III–V detectors, but their response only extends to 1.1 µm in the infrared.

If the length of this optical fiber network is relatively short, and if moderate bandwidths are required, it is possible and perhaps desirable to operate the network at other wavelengths, where the sources and detectors are less costly. Efficient waveguide lasers that operate at 1.06 µm can be useful for networks such as these. Such networks can find application in aircraft, ships, automobiles, or cable television distribution.

Integrated optic laser oscillators and amplifiers have also been produced using laser glass substrates, i.e., neodymium-doped laser glass. Such devices employing silicate glasses operate at wavelengths near 1057 nm and, in phosphate glasses, operate at wavelengths near 1057 nm and 1355 nm. See, e.g., Sanford et al., Opt. Lett., 15:366 (1990); Sanford et al., Opt. Lett., 16 (14):1095; Sanford et al., Opt. Lett., 18 (4):281 (1993); Aoki et al., IEEE Photon. Tech. Lett., 2:459 (1990); and Aoki et al., Elec. Lett., 26:1910 (1990). However, efficient lasing with high output power and high efficiency has not been achieved at these wavelengths.

U.S. Pat. No. 5,080,503 discloses an optical waveguide device in which a waveguide, embedded in a substrate, contains a rare earth element and can be used as a laser, i.e., at the emission wavelength of the rare earth element. The waveguide region is embedded into the substrate by first depositing a film onto the substrate surface by an evaporation process. Through the use of a mask, openings are provided in the film, thereby exposing portions of the substrate surface. The substrate in then immersed in a molten salt and the waveguide region is formed by ion exchange. For example, the substrate can be immersed into a molten salt bath. The exchange of ions from the salt bath into the substrate will form the waveguide region.

U.S. Pat. No. 4,993,034 discloses a laser waveguide medium exhibiting a peak wavelength at 1.054 nm. See FIGS. 9 and 10. The optical waveguide region is formed in a laser glass substrate by an ion exchange procedure. In the ion exchange, alkaline ions are exchanged for other ions. In particular, Ag$^+$ ions are exchanged for Na$^+$ ions in the substrate. Alternatively, Cs$^+$ ions can be exchanged for K$^+$ ions in the substrate. The laser glass substrate contains 0.01–8 mole % Na$_2$O or 0.01–18 mole % K$_2$O. Amounts of Na$_2$O greater than 8.0 mole % lead to deterioration of chemical durability. Thus, when the Na$_2$O content of the substrate exceeds 8 mole %, a crack or distortion can occur in the substrate during the ion exchange procedure. Also, excess Ag$^+$ ion exchange is said to occur resulting in silver colloid formation.

SUMMARY OF THE INVENTION

An object of the invention is to provide a laser waveguide medium for use in a waveguide laser to produce light amplification or laser oscillation at or near the 1.3 µm region. Another object is to produce a waveguide laser which produces light amplification or laser oscillation at high efficiencies and/or high power output. An additional object is to provide a waveguide laser medium which provides laser amplification at multiple wavelengths. A further object is to provide a laser waveguide medium which operates at about 906 nm. Another object is to provide a laser waveguide medium which operates at 1.06 µm and thus is suitable, e.g., for short-haul communication applications.

Upon further study of the specification and appended claims, further objects and advantages of this invention will become apparent to those skilled in the art.

These objects are achieved by a laser waveguide medium comprising:

a laser glass substrate wherein the substrate is a glass comprising (on an oxide composition basis):

|  | Mole % |
|---|---|
| $P_2O_5$ | 50–70 |
| $Al_2O_3$ | 4–13 |
| $Na_2O$ | 10–35 |
| $La_2O_3$ | 0–6 |
| $Ln_2O_3$ | >0–6 |
| R'O | 0–20 |
| $R_2O$ | 0–18 | wherein $Ln_2O_3$ is the sum of the oxides of active lasing lanthanides of atomic numbers 58–71, R'O is the sum of oxides of Mg, Ca, Cr, Ba, Zn and Pb, and $R_2O$ is the sum of oxides of Li, K, Rb and Cs; and a waveguide region embedded in the substrate, the waveguide region having a higher refractive index than the substrate and the waveguide region having an inlet region through which light can enter and an outlet region through which light can exit. See also Malone et al., "Integrated Optic Laser at 905, 1057 and 1356 nm," Optical Society of America (OSA), Advanced Solid State Laser Conference, New Orleans, Lous. (Feb. 1, 1993), and Malone et al., "Integrated Optic Laser Emitting at 906, 1057 and 1358 nm," Electronics Letters, Vol. 29, No. 8, pp. 691–692 (Apr. 15, 1993).

The waveguide region preferably is a channel waveguide embedded in the top surface of the laser glass substrate. Preferably, the substrate is shaped as a solid rectangle having a top surface, bottom surface, two side surfaces and two end surfaces. In such a case, the inlet region of the waveguide region is at one end surface of the substrate and the outlet region is at the other end surface. See, e.g., FIG. 9.

Many other substrate shapes are possible. Also, light can be introduced into the waveguide by prisms or grating structures fabricated directly on the waveguide surface. Thus, the waveguide inlet and outlet regions need not be on end surfaces. The waveguide region can also have multiple outlet regions. See, e.g., Sanford et al., Optics Letters, Vol. 18, No. 4 (Feb. 15, 1993).

Production of the waveguide region is preferably achieved by subjecting a portion of the substrate surface to ion exchange wherein ions of the laser glass substrate are exchanged for other ions. The ion exchange results in formation of a region having a higher refractive index than that of the substrate. In particular, $Na^+$ ions of the substrate are exchanged for $Ag^+$ ions. Other ion exchanges are, however, possible, for example, exchange of $Na^+$ ions for $K^+$ ions. See also *Integrated Optical Circuits and Components: Design and Applications*, edited by L. D. Hutchenson, pp. 70–76 (1987), regarding ion-exchange processes for forming embedded waveguides. Introduction of silver ions into silicate glasses by ion exchange is discussed in Araujo, Applied Optics, Vol. 31, No. 25, pp. 5221–5224 (September 1992).

By introduction of light at an appropriate wavelength into the inlet region of the laser waveguide medium, a laser waveguide is obtained. The laser waveguide can operate as a laser amplifier or, by the use of mirrors associated with both the inlet region and the outlet regions of the waveguide, the laser waveguide can function as a laser oscillator.

According to a further aspect of the laser waveguide medium according to the invention, lasing at multiple wavelengths is achieved. In particular, the laser waveguide medium achieves lasing at wavelengths in the ranges of 905–906 nm, 1055–1058 nm and 1322–1358 nm, for example, at wavelengths of about 906 nm, 1057 nm, 1325 nm and 1358 nm. For example, inlet and outlet couplers, i.e., mirrors, can be selected so as to achieve laser oscillation at, about a wavelength of 906 nm. Lasing action at a wavelength of about 906 nm has been achieved in Nd-doped silica fibers but not in glass integrated optical waveguides. See Poet al., Digest of Annual Meeting of the Optical Society of America, Paper FD-4 (1986).

The laser waveguide medium according to the invention achieves lasing at the 1057 nm wavelength with both high output power and high slope efficiency. At a lasing wavelength of 1358 nm, the output power and slope efficiency are also high. Moreover, by choosing the appropriate cavity design and mirror reflectivity, the 1358 nm lasing activity can be tuned to provide lasing action in the 1310 nm range used in telecommunications. A cavity design which can be used to tune lasing actions, provided there is net optical gain, is described by Sanford et al., "Extended-Cavity Operation of Rare-Earth-Doped Glass Waveguide Lasers," Optical Letters, Vol. 16, No. 14, pages 1095–1097 (July 1991).

The achievement of multiple lasing wavelengths greatly expands the range of applications for which the laser waveguide medium can be employed. Thus, for example, a laser waveguide providing lasing at about 906 nm can be employed in laser spectroscopy. On the other hand, lasing in the 1060 nm range can be useful in scanning procedures, as well as short-haul fiber optic communications. In addition, lasing in the 1300 nm range is particularly desirable for applications in telecommunications.

Also, the ability to operate simultaneously at more than one wavelength has advantages. For example, if a laser operates at both a first wavelength that requires an expensive sensor and a second wavelength which needs only a low cost sensor, laser operation can be detected using the less expensive sensor.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Laser Glass Substrate

Figure 1:
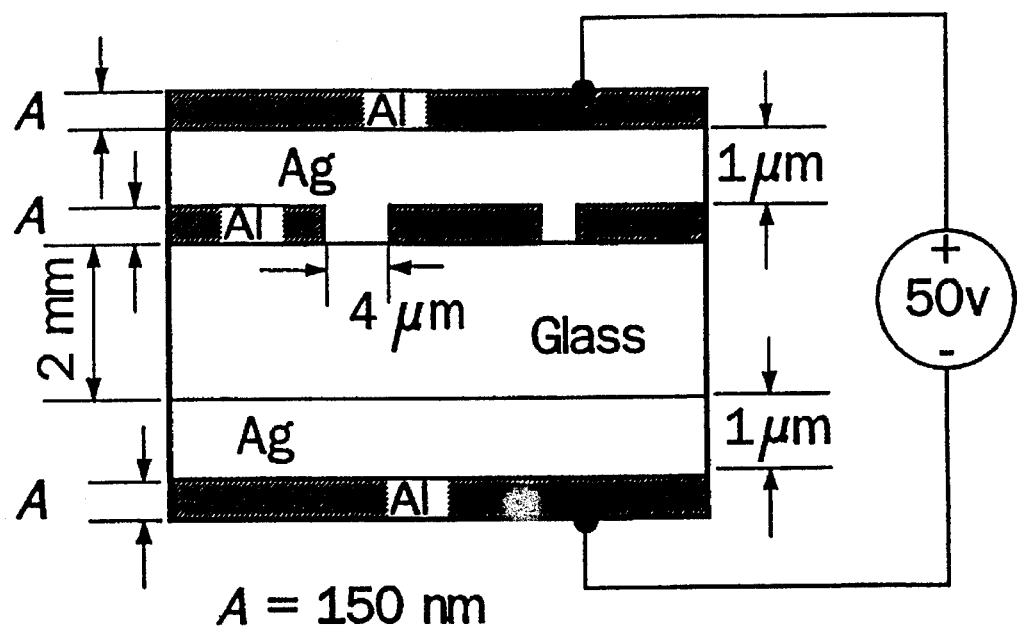
FIG. 1 illustrates a fabrication of a waveguide by $Ag^+$ ion exchange via electric field-assisted migration.

The laser glass substrate is a glass comprising the following components (on an oxide composition basis):

|  | Mole % |
|---|---|
| $P_2O_5$ | 50–70 |
| $Al_2O_3$ | 4–13 |
| $Na_2O$ | 10–35 |
| $La_2O_3$ | 0–6 |
| $Ln_2O_3$ | >0–6 |
| R'O | 0–20 |
| $R_2O$ | 0–18 |

Preferably, the glass consists essentially of the above components.

A preferred laser glass composition consists essentially of the following components (on an oxide composition basis):

|  | Mole % |
|---|---|
| $P_2O_5$ | 50–70 |
| $Al_2O_3$ | 4–13 |
| $Na_2O$ | 10–35 |
| $La_2O_3$ | 0–6 |
| $Ln_2O_3$ | >0–6 |
| R'O | 0–20 |
| $R_2O$ | 0–18. |

Phosphate glass was selected as the material for the laser glass substrate due to ease of preparation and the good laser properties. The only other commonly available glasses are silicates. However, 1.3 µ lasing is not possible with silicate glasses due to the phenomena of excited state absorption (ESA). See S. Zemon et al., IEEE Phot. Tech. Lett. 4(3), 244 (1992). Thus, the glass compositions employ $P_2O_5$ as the principle glass former. Generally, the $P_2O_5$ content is 50–70, e.g., 60 mole %. The $P_2O_5$ content can also be defined in terms of, for example, 51, 52, 53, 54, 56, 57, 58, 59, 61, 62, 63, 64, 65, 66, 67, 68 and 69 mole %.

$Al_2O_3$ is added chiefly for durability. Phosphate glasses are normally attacked by molten salt baths and other processing chemicals used in waveguide preparation procedures (e.g., to remove ion diffusion barriers). The level of $Al_2O_3$ is generally 4–13%. Other levels of $Al_2O_3$ are 5, 6, 7, 8, 9, 10, 11 and 12 mole %.

Additional durability enhancing agents can be selected from the R'O components provided they are not present in levels which would hinder the ion exchange process, e.g., silver-for-sodium, used for forming a waveguide.

The R'O components, MgO, CaO, SrO, BaO, ZnO and PbO, are thus useful in substrate materials for fabrication of waveguide structures, especially channel waveguide structures, which can then function as integrated optic laser oscillators and amplifiers.

The total amount of R'O components is generally 0–20 mole %. Other levels of R'O are 1, 2, 3, 4, 5, 6, 7, 8, 9, 10, 11, 12, 13, 14, 15, 16, 17, 18 and 19 mole %.

Sodium is used because it is very mobile (alkalis have high diffusion rates). Since the size of the $Na^+$ ion is similar to that of the $Ag^+$ ion, it exchanges well with silver (in comparison to other alkali ions). Generally, the $Na_2O$ content is 10–35 mole %, e.g., 24 mole %. The $Na_2O$ amount can also be, for example, 11, 12, 13, 14, 15, 16, 17, 18, 19, 20, 21, 22, 23, 24, 25, 26, 27, 28, 29, 30, 31, 32, 33 or 34 mole %.

As mentioned above, U.S. Pat. No. 4,993,034 describes not exceeding a $Na_2O$ content of 8.0 mole %. However, the substrate according to the invention, even with its higher $Na_2O$ content exhibits sufficient chemical durability to be used for waveguide fabrication. Further, the low attenuation value indicates that no appreciable Ag colloid formations occur.

The alkali components, other than sodium, i.e., $R_2O$ ($Li_2O$, $K_2O$, $Rb_2O$, and $Cs_2O$), can also be used in substrate materials. The level of $R_2O$ is generally 0–18 mole %, preferably 0–10 mole %, e.g., 1, 2, 3, 4, 5, 6, 7, 8, 9, 10, 11, 12, 13, 14, 15, 16 or 17 mole %.

The amount of a lasing species or lasing system (e.g., a lasing species/energy transfer species combination) present in the glass is effective for lasing, generally >0–6 mole %, e.g., 0.01–6 mole % (on an oxide basis); however, the amount of these species can be optionally higher, e.g., up to 10% or even up to 20% or higher in total. The lasing species, Ln, can be, e.g., Nd, Pr, Pm, Sm, Eu, Tb, Ho, Er, Yb, etc., or combinations of these species in which one or more lanthanide ion acts to sensitize the lasing activity of one or more other lanthanide ions in the glass. Optionally, other lasing species or lasing system combinations can be employed including transition metals like chromium and vanadium, which have broad and intense absorption bands and resultant co-dopant fluorescent bands which overlap with the primary lasing ion absorption levels. See, e.g., *Physics of Laser Fusion*, Volume IV, "The future Development of High-Power Solid State Laser Systems." The preferred lasing species of this invention are Nd and Pr, with Nd being especially preferred.

For example, $Nd_2O_3$ or $Pr_2O_3$, the most preferred lasing species, is added to the glasses in sufficient quantity to achieve the desired lasing activity, as is true for other lasing species and systems. For example, the glass can contain 0.01, 0.03, 0.05, 0.07, 0.08, 0.1, 0.3, 0.5, 0.7, 0.8, 1.0, 1.3, 1.5, 1.8, 2.0, 2.1, 2.3, 2.5, 2.7, 2.9, 3.0, 3.1, 3.3, 3.5, 3.7, 3.9, 4.0, 4.1, 4.3, 4.5, 4.7, 4.9, 5.0, 5.1, 5.3, 5.5, 5.7 or 5.9 mole % of $Ln_2O_3$.

Neodymium is the leading ion known for lasing in the region of 1.06 µm in glass. Other ions (and combinations of ions) and wavelength combinations are also of interest such as neodymium for use at approximately 0.9 µm and 1.3 µm; Pr at approximately 1.3 µm; Yb and Er, as a sensitizing ion and lasing ion, respectively, in combination for use at approximately 1.5 µm. Neodymium and praseodymium are the leading ions for lasing in the region of 1.3 µm.

Addition, of $La_2O_3$ allows direct substitution of $Nd_2O_3$ or other lasing or energy transfer lanthanide species by another oxide which is nearly an exact structural replacement of, e.g., $Nd_2O_3$. This allows the manufactured glass to be produced with a broad range of neodymium or other lasing species doping levels while minimizing the change from this adjustment on the physical, optical, and thermal properties of the produced glasses. Thus, $La_2O_3$ amounts typically are 0–6 mole %, for example, 0.1, 0.2, 0.3, 0.5, 0.7, 0.9, 1.0, 1.2, 1.4, 1.6, 1.8, 2.0, 2.2, 2.3, 2.4, 2.5, 2.6, 2.7, 2.8, 2.9, 3.0, 3.2, 3.4, 3.6, 3.8, 3.9, 4.0, 4.2, 4.4, 4.6, 4.8, 5.0, 5.2, 5.4, 5.6 or 5.8 mole %.

Other conventional additives are to be avoided, chiefly elements such as refining agents (i.e., $As_2O_3$ and $Sb_2O_3$) and antisolarants ($Sb_2O_3$ and $Nb_2O_5$). Polyvalent metals such as As can, during ion exchange of alkali for silver, generate silver metal colloidal particles in the glass which leads to a waveguide exhibiting high loss (absorption) and poor optical quality (scattering centers). Thus, the amount of polyvalent metals in the laser glass substrate should be low enough so that formation of Ag colloids are avoided. Preferably, the amount of such polyvalent metals is 0.

The glass substrates of this invention can be fully conventionally prepared by mixing the appropriate amounts of each constituent to form a batch composition which is then charged into a fused silica crucible and melted by induction heating from, e.g., 1100° C. to as much as 1500° C., depending on the chosen composition. The glass can then be refined at temperatures exceeding, e.g., 1300° C. from typically 2 to 4 hours, again depending on composition and melt viscosity, with equal intervals of gas bubbling and stirring. The glass is then typically cast into steel molds and annealed at the transformation temperature plus about 20° C. for about 2 hours followed by cooling at about 30° C./hour. These procedures were followed in the examples below.

As noted above, the examples of this application are melted in a fused silica crucible. Under such melting conditions, as is well known, there will be some silica added from the crucible to the final glass composition. Accordingly, whereas all compositions given in this disclosure refer to the component contents as added to the batch as is conventional (batch compositions), where a fused silica crucible is employed, the final composition will contain some silica, regardless of whether $SiO_2$ is added as a batch component. This conventional difference from the initial batch composition is analogous to other differences between final glass compositions and batch compositions, e.g., due to the volatilization of ingredients, etc. The amount of silica will generally be no more than about 3.5, 3, 2.5, 2, 1.5, 1, 0.5 mole %, etc., especially not more than about 3 mole % and most especially not more than about 2 mole % (all on a renormalized basis). In a preferred aspect of this invention, the final composition contains no more than 3 mole % silica, especially not more than 2 or 1 mole % silica (on the mentioned basis) due to the effect of silica dissolution from the crucible. Of course, where a nonsilica-containing crucible is employed, this effect will not occur.

The silica contribution from the crucible will vary conventionally with melt temperature and melting time. For example, in a melt of about 2 hours at a temperature of about 1300° C., about 2 wt. % of silica will be contributed from a quartz crucible, the precise amount being determined by the precise conditions involved such as glass volume exposed, crucible surface area, glass composition, degree of agitation in the melt, etc.

WAVEGUIDE

Waveguides in accordance with the invention can be fabricated by a variety of means. Preferably, silver is substituted for sodium and, to some extent, other alkali ions in the glass through techniques such as molten salt bath ion exchange and electric field-assisted migration from solid silver films. Such ion exchange generally is conducted at elevated temperatures, e.g., about 350° C.

Additionally, techniques in which the glass is used as a sputtering target to be deposited onto a suitable substrate such as another glass can be used to form optical waveguides. In this fabrication technique, the glass is used as a sputtering target in, for example, a R. F. planar magnetron sputtering system. The glass is sputtered off of the target and onto a bare glass substrate. The resulting structure is a passive glass substrate having a planar film of the neodymium-doped glass. Channel waveguides can then be formed by photolithography and plasma etching.

Other waveguide fabrication procedures are described by Aoki et al., U.S. Pat. No. 4,993,034. See column 6, lines 28–36.

Ion exchange from silver films is attractive for integrated optic waveguide fabrication since it is a dry process which does not use molten salts. While $K^+$ ions can possibly be used instead of $Ag^+$ ions for the ion exchange process, the former cannot be exchanged from a solid film. $K^+$ ion exchange can be performed by evaporating an aluminum film onto the surface of the glass substrate. Apertures are then opened in the film by standard photolithographic techniques. The glass is then immersed in a molten bath of, e.g., potassium nitrate whereby ion exchange occurs to obtain the desired waveguiding properties. Depending upon the exact process conditions, waveguides formed by electric-field-assisted $Ag^+$ ion exchange may be deeper and wider than those formed by purely thermal $K^+$ ion exchange.

In accordance with the invention, channel waveguide structures are prepared by techniques in which portions of the substrate that are not intended to be subjected to ion exchange are selectively protected with a barrier to ion migration, e.g., aluminum or a photoresist, which acts to block the ion exchange process, i.e., silver-for-alkali, so that the localized refractive index of the exchanged region differs from the surrounding substrate glass, thus leading to the effect of waveguiding.

For example, in the molten salt bath technique, a glass is provided with a single aluminum film into which apertures have been opened by standard photolithographic techniques. The glass is then immersed in a molten bath of, e.g., silver nitrate whereby ion exchange occurs to obtain the desired waveguiding properties.

In the electrical field-assisted migration procedure, the top surface of a glass wafer can be provided with, for example, an aluminum film which is then treated by standard photolithographic techniques to provide the aluminum film with apertures. A silver film is deposited on the aluminum film and then another aluminum film is provided on top of the silver film. A silver film and an aluminum film are then applied to the bottom surface of the wafer. Ion exchange is achieved by applying an electric field across the wafer, e.g., 50 V at about 350° C. The treated wafer can then be annealed and the metal films removed. Electrical field-assisted ion migration is the preferred method of ion exchange in accordance with the invention.

The width and depth of the resultant waveguide region is dependent upon, for example, the time period of ion exchange and the size of the aperture in which exchange occurs. Further, in the case of electrical field-assisted ion migration, the width and depth of the waveguide region is also dependent upon the applied voltage and the thickness of the silver film. Thus, the size of the waveguide region can be tailored to a desired application. In general, the waveguide region has a width and depth each within the range of 4–100 μm, preferably 4–50 μm.

In many cases, waveguide regions which exhibit smaller widths and depths do not require as much pump light to achieve lasing activity, i.e., they have a lower lasing threshold of absorbed pump power. Further, by varying the size of the waveguide region, various numbers of transverse modes can be achieved. Thus, with a waveguide region of smaller dimensions, single transverse mode operation is possible, whereas with a waveguide of larger dimensions, multiple transverse mode operation is possible. In addition, if the laser waveguide medium is to be used in conjunction with an optical fiber, the width and depth of the waveguide region is preferably adjusted so that the mode field of the waveguide medium corresponds to the mode field of the optical fiber.

To minimize pump power, waveguides are preferably designed so that transverse mode field of the pump most efficiently couples energy to the mode field of the lasing mode. Depending upon the details of the waveguide fabrication, this may occur for a single mode or multimode pump or laser output.

As a result of the ion exchange, the waveguide region exhibits a refractive index which is higher than that of the laser glass substrate. The difference in refractive index between the laser glass substrate and the waveguide region must be sufficient to achieve waveguiding properties. For $Ag^+$ ion exchange, the difference in refractive index is preferably about 0.04–0.05, e.g., 0.047. For $K^+$ ion exchange, the difference in refractive index is preferably about 0.007–0.01, e.g., 0.009. In the case of ion exchange from solid to silver films, the refractive index difference is not easily varied. However, it is possible to vary the refractive index by varying the substrate composition.

For the case of ion exchange from molten salts, it is possible to dilute the melts and thereby alter the resultant difference in refractive index. See Ramaswamy et al., "Process Optimization of Buried $Ag+$-$Na^{+i\ Ion}$-Exchanged Waveguides: Theory and Experiment," Applied Optics, Vol. 27, No. 9, pp. 1814–1819 (May 1, 1988).

The number of transverse modes can be reduced by exchanging a very slight amount of silver into the waveguiding region, and then annealing the waveguiding region for some time. See Tervonnen et al., "*Examination of Two-Step Fabrication Methods for Single-Mode Compatible Ion-Exchanged Glass Waveguides,*" Applied Optics, Vol. 30, No. 3, pp. 338–343 (Jan. 20, 1991).

The waveguide region preferably exhibits as low an attenuation loss value as possible. For this reason, as discussed above, it is desirable to avoid the formation of Ag colloids during the ion exchange. The presence of Ag colloids in the waveguide region results in higher absorption. Therefore, as mentioned above, a laser glass substrate preferably does not contain polyvalent metals. In general, the attenuation losses for the laser waveguide medium should be as low as possible, e.g., $\leq 2.0$ dB/cm. In accordance with the invention, the attenuation loss exhibited by the waveguide is preferably $\leq 1.9$ dB/cm, especially $\leq 0.5$ dB/cm.

Following ion exchange to achieve waveguiding properties, the glass can be cut into sections, e.g., about 1 cm long, and the end faces given an optical polish. The waveguide can then be employed as a laser waveguide amplifier by using a suitable pump light source. Alternatively, mirrors can be attached and the resultant optical waveguide medium can be employed in, e.g., an optically pumped laser oscillator.

The surface of the waveguide region can also be covered by a deposited film or layer in accordance with known procedures, thereby resulting in passivation of the waveguide. See, e.g., L. D. Hutchenson, Integrated Optical Circuits and Components: Design and Applications, p. 56–57 (1987).

The length of the device can be made as long as desired, for example, as long as 5–10 cm. Ideally, the length of the device is chosen so that the pump light is substantially or completely absorbed over the length of the device. It is also possible in a shorter sample to coat the output mirror in a manner such that excess pump light is folded back into the sample and not wasted. Longer devices will give more gain, if the lasing ion population, e.g., neodymium, can be inverted. A practical way to achieve this is to pump the device from both ends.

The mirrors, i.e., the input and output couplers, are selected to provide laser oscillations at the desired lasing wavelength. In a laser oscillator, light directed along the axis of the laser medium oscillates back and forth between the mirrors, which thus acts as a resonator. The wavelength of light which oscillates within the laser is determined by the reflection and transmission properties of the mirrors.

The mirror associated with the inlet region of the waveguide possesses a high transmittance with respect to the pump light at the pump wavelength, e.g., preferably at least about 90%, especially at least 95%, e.g., 100%. On the other hand, the inlet mirror (input coupler) preferably reflects preferably at least about 95%, especially at least 99%, e.g., 100%, of the laser oscillation light at the desired lasing wavelength, e.g., 905–906 nm, 1055–1058 nm, or 1322–1358 nm. The output mirror, which also reflects a high percentage of the laser oscillation light, preferably transmits at least about 80%, especially at least 90%, and particularly at least 96% of light at the desired lasing wavelength.

It is well known, however, that there is a trade-off between slope efficiency and lasing thresholds in lasers. For example, a device with an output mirror with 4% transmission at the desired lasing wavelength will have a lower threshold than a similar device with an output mirror with 20% transmission at the desired lasing wavelength. The device with the 20% transmission output mirror will have a lower slope efficiency, greater output power, but a higher threshold for lasing than the device with the 4% transmission output mirror.

These mirrors can be formed by vacuum depositing dielectric layers onto thin glass plates. Alternatively, the dielectric coatings can be deposited directly onto the end-faces of the device.

Typically, the inlet coupler is attached to one end surface and the outlet coupler is attached to the other end surface of the waveguide medium. However, other cavity designs can be employed, for example, extended-cavity designs (see Sanford et al., Optics Letters, 16, 1095 (1991). Particularly, desirable designs are those which can force lasing action to particular wavelengths of interest. Examples include the employment of a distributed feedback grating as one or both mirrors of the device, which introduce cavity losses at undesired transition energies and offer minimum cavity losses at the wavelength of interest. In this way, a lasing transition energy with a smaller strength can become the dominant wavelength of operation in the device. Another example is extended-cavity operation of these devices whereby the laser cavity is extended beyond the endfaces of the device. Reflection gratings incorporated into this extended cavity can then be used to tune the emission wavelength over a wide range by changing the angle of the grating. In this way, the lasing action of the laser waveguide can be tuned to a wavelength in the 1.3 μm range, provided there is net optical gain, and thereby provide a laser waveguide suitable for telecommunications applications.

With respect to the pump light, optically pumping the neodymium ions at 780–815 nm into the unresolved $^4F_{5/2}$ and $^2H_{9/2}$ levels is preferred to pumping at shorter wavelengths. Pumping the neodymium at 570–590 nm into the unresolved $^4F_{5/2}$ and $^2F_{7/2}$ levels is possible; however, the neodymiun ions must relax non-radiatively down to the metastable $^4F_{3/2}$ level. This reduces the efficiency of the laser waveguide considerably.

For laser waveguides where neodymium is the lasing ion, the pump light source which provides light used to generate the laser can be any source which can generate light at a wavelength of 780–815 nm, for example, another laser such as a Ti-sapphire laser or a laser diode. Light from the pump light source can be focused onto the inlet region of the channel waveguide by the use of a small lens (e.g., a 10 X pump objective), a graded index lens, and/or optical fibers such as described in U.S. Pat. No. 4,993,034.

When using praseodymium as the active lasing ion, the waveguide medium is preferably pumped in the region of 1000–1015 nm with, e.g., a laser diode or a titanium-sapphire laser.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosure of all applications, patents and publications cited above are hereby incorporated by reference.

EXAMPLES

Example 1

General Procedure for Field Assisted Ion Exchange

Waveguide laser media, in accordance with the invention, can be prepared by the following general procedure.

The base glass composition is first prepared by mixing appropriate amounts of each chemical in the formulation to prepare a glass batch. The batch is melted in a fused silica crucible at 1300° C. for 2 hours. The glass is then cast into a steel mold and annealed at 530° C. for two hours before being cooled to room temperature.

The resultant casting is cut to yield polished wafers of 35 mm×35 mm×2 mm thick. On the top surface of these wafers, a 150 mm thick aluminum film is deposited. Apertures with lengths of 35 mm and widths ranging from 2 μm to 8 μm are opened in this film by conventional photolithography and wet chemical etching. A 1 μm film of silver is then deposited on the top surface, followed by a second aluminum film 150 nm thick. A 1 μm silver film and a 15 nm aluminum film are then deposited on the backside of the wafer.

Ion exchange of silver for sodium is performed by applying 50 V across the wafer at 350° C. for 20 minutes. The wafer is then annealed for 10 minutes at 350° C. for 10 minutes without the electric field. The metal films are then removed with a chemical etchant. The wafer is diced into 1.4 cm long sections containing the silver exchanged regions, and the end faces polished. In this way, channel waveguides are prepared on the surfaces of these 1.4 cm long sections.

EXAMPLE 2

General Procedure for Molten Salt Ion Exchange

Initially, the base glass composition is prepared by mixing the appropriate amounts of each chemical and then preparing a glass batch. The glass is then cast, annealed and cooled.

The glass is then cut into substrates of desired dimensions. A 200 nm aluminum film is deposited on the surfaces of the glass substrate. Using conventional photolithography, apertures within the range of 2–10 μm are opened in the aluminum film. The aluminum-coated substrate is then immersed in a $KNO_3$ molten salt bath at about 380° C. for about 6 hours.

The aluminum film is then removed using a chemical etchant and the end faces of the substrate are polished. The resultant channel waveguide medium exhibits a waveguide region in which $K^+$ ions have replaced $Na^+$ ions. The difference in refractive index between the waveguide region and the glass substrate is about 0.009. The channel waveguide operates in single transverse mode.

Example 3

A phosphate glass was prepared in accordance with the following composition:

| Oxide | Mole % | Wt. % |
| --- | --- | --- |
| $P_2O_5$ | 60.21 | 69.28 |
| $Na_2O$ | 23.74 | 11.93 |
| $Al_2O_3$ | 13.04 | 10.78 |
| $La_2O_3$ | 2.26 | 5.96 |
| $Nd_2O_3$ | 0.75 | 2.05 |

The glass has a refractive index of about 1.525.

Arsenic trioxide ($As_2O_3$) is usually added to glass during melting to remove bubbles and occlusions. However, arsenic trioxide also acts as an electron donor which reduces the silver ions in the waveguide region to elemental silver (Findakly, Opt. Eng. 24, 244 (1985)). The reduced silver leads to optical absorption and scattering which limit the usefulness of silver ion-exchanged devices. Thus, the above glass composition contains no arsenic trioxide or other refining agents.

The glass was cut into 35 mm×35 mm×2 mm wafers, and the top surface was polished. A 150 nm thick aluminum film was deposited onto the top surface of the wafer. Apertures ranging from 3 μm to 8 μm were opened in the film by photolithography and wet chemical etching. A 1 μm thick silver film was deposited on top of the first aluminum film, which was followed by another 150 nm thick aluminum film. A 1 μm silver film and a 150 nm aluminum film were deposited on the backside of the wafer.

The ion exchange was performed by applying 50 V across the wafer at 350° C. The exchange was performed for 20 minutes. The device is shown in FIG. 1. The wafer was then annealed at 350° C. for another 10 minutes without the electric field. The metal films were removed, the wafer was diced into small chips, and the endfaces were polished.

Optical losses of the 1.4 cm long device were measured using the optimum coupling technique (Haruna et al., Elec. Lett. 28, 1612 (1992)). The measured loss was not more than 0.5 dB/cm. Dielectric mirrors were then attached to the device with small clips. The device was end-pumped with a CW titanium-sapphire laser. The lasing spectra were recorded with an automated spectrometer with 0.2 nm resolution.

Absorbed pump power can be measured in the following manner. The titanium-sapphire laser is first tuned to a wavelength where the glass is highly transmitting. For this glass, it was tuned near 850 nm. The light is coupled into and out of the laser waveguide using 10 X microscope objectives. The losses of the lenses and mirrors are determined and the overall coupling efficiency can be determined. The titanium-sapphire laser wavelength is then tuned to where the glass is highly absorbing, in this case 780–815 nm. Since the coupling losses are known, the pump power absorbed in the waveguide can then be determined.

Figure 2:
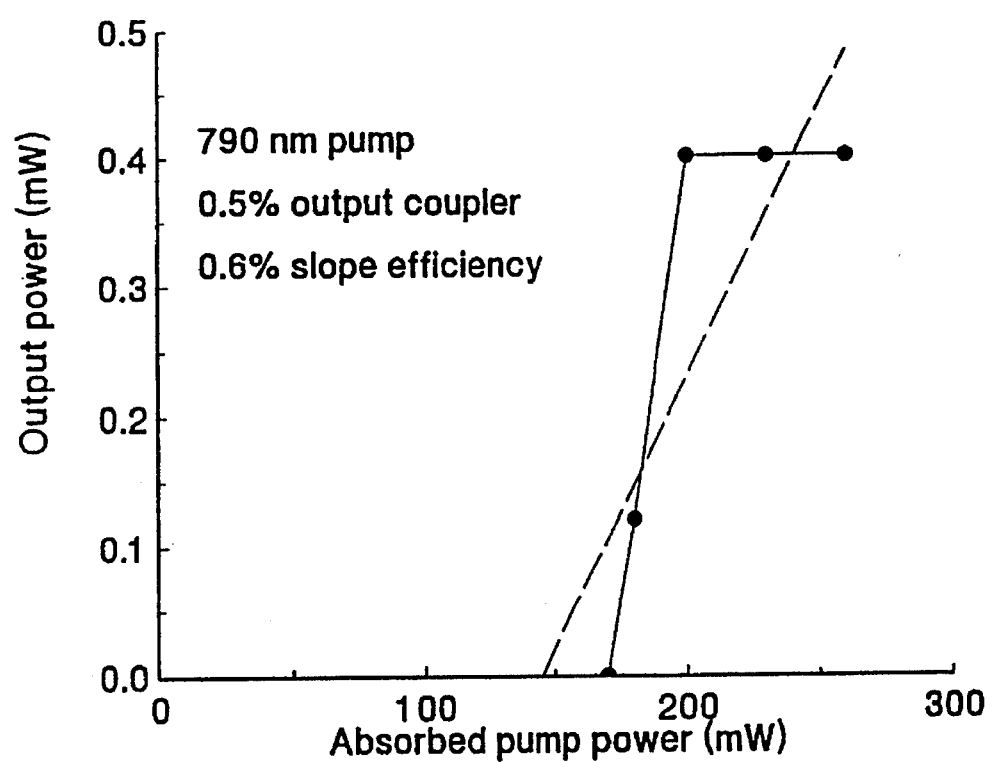
FIG. 2 is a graph of output power as a function of absorbed pump power for 906 nm lasing.
Figure 3:
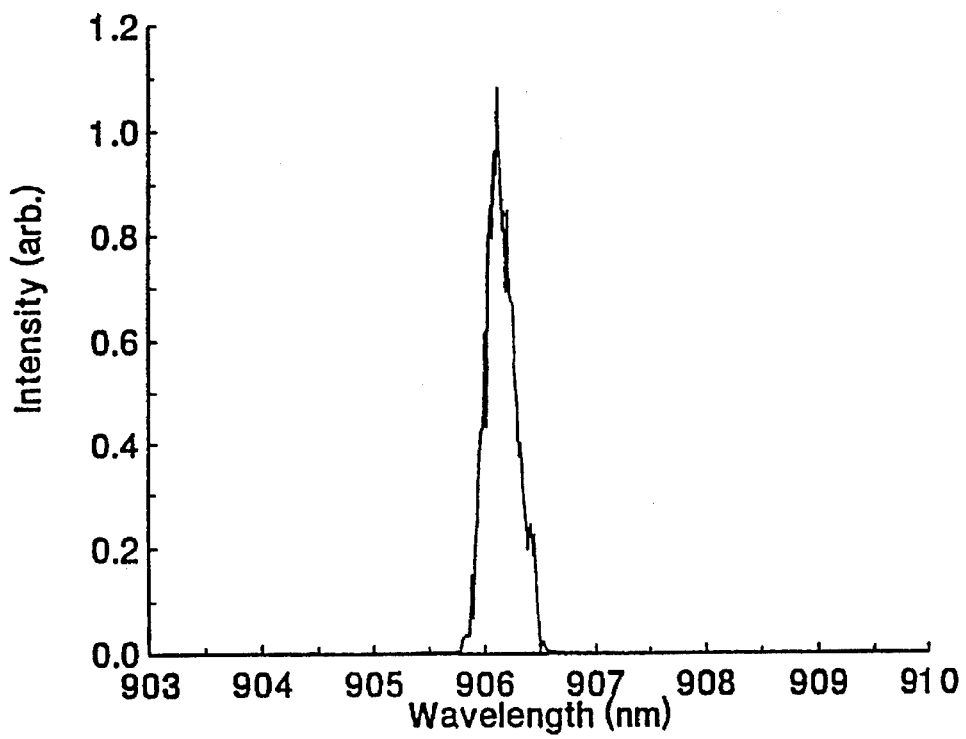
FIG. 3 shows a laser spectrum for the 906 nm lasing range.

Using input and output couplers designed to provide oscillation of light at 906 nm, a waveguide exhibiting a maximum output power of about 0.4 mW was achieved at a wavelength of 906 nm. See FIG. 2. With a 0.5% output coupler (0.5% transmission of 906 nm wavelength), the lasing threshold was 170 mW of absorbed pump power and the slope efficiency was about 0.6% based on absorbed pump power. The predominant pump light wavelength was 790 nm and the maximum theoretical slope efficiency is 87.1%. The laser spectrum shown in FIG. 3 was recorded at 200 mW of absorbed pump power at 789 nm.

Figure 4:
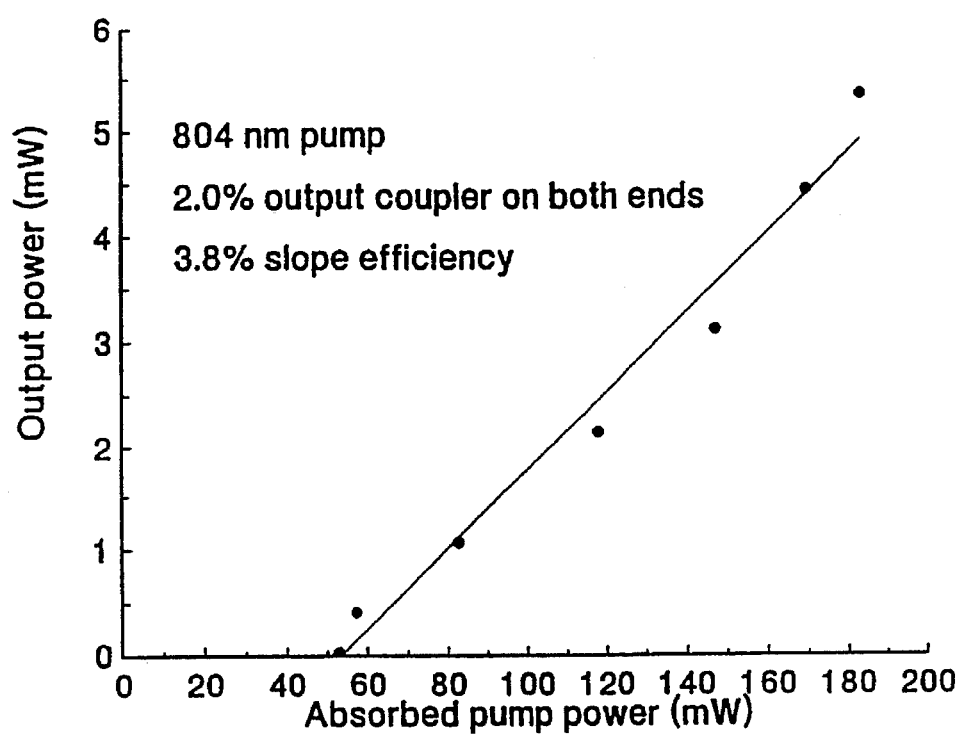
FIG. 4 is a graph of output power as a function of absorbed pump power for 1358 nm lasing.
Figure 5:
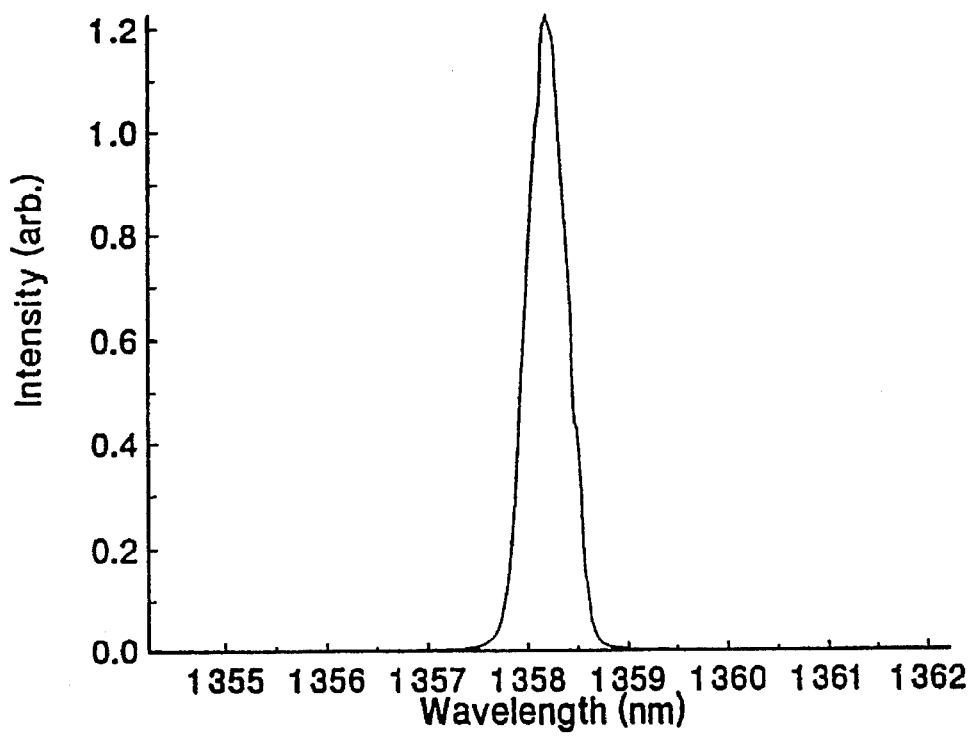
FIG. 5 shows a laser spectrum for the 1358 nm lasing range.

FIG. 4 illustrates lasing action at 1358 nm. The 1356 nm laser spectrum shown in FIG. 5 was recorded with 240 mW of absorbed pump power at 804 nm. Transient lasing was also observed at 1328 nm. Using mirrors having 2.0% transmission at 1358 nm for both the input and output couplers, a waveguide lasing at 1358 nm was achieved with a maximum output power of about 5.5 mW. The lasing threshold was 52 mW of absorbed pump power and the slope efficiency 3.8% with a pump light of 804 nm (theoretical maximum efficiency=59.2%).

Figure 6:
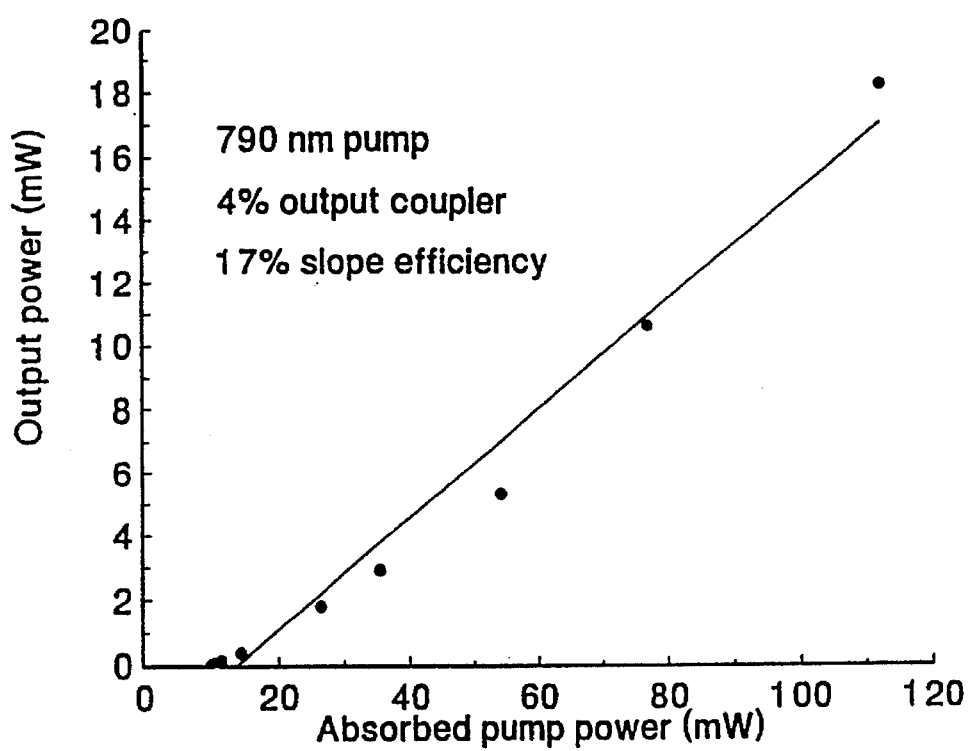
FIG. 6 is a graph of output power as a function of absorbed pump power for 1057 nm lasing using 4% output coupler.

As shown in FIG. 6, the threshold for 1057 nm emission was 12 mW of absorbed pump power using a 4% output coupler at a pump light wavelength of 790 nm. The slope efficiency was about 17% (the theoretical maximum efficiency=74.7%) and the maximum output power of about 18 mW.

Figure 7:
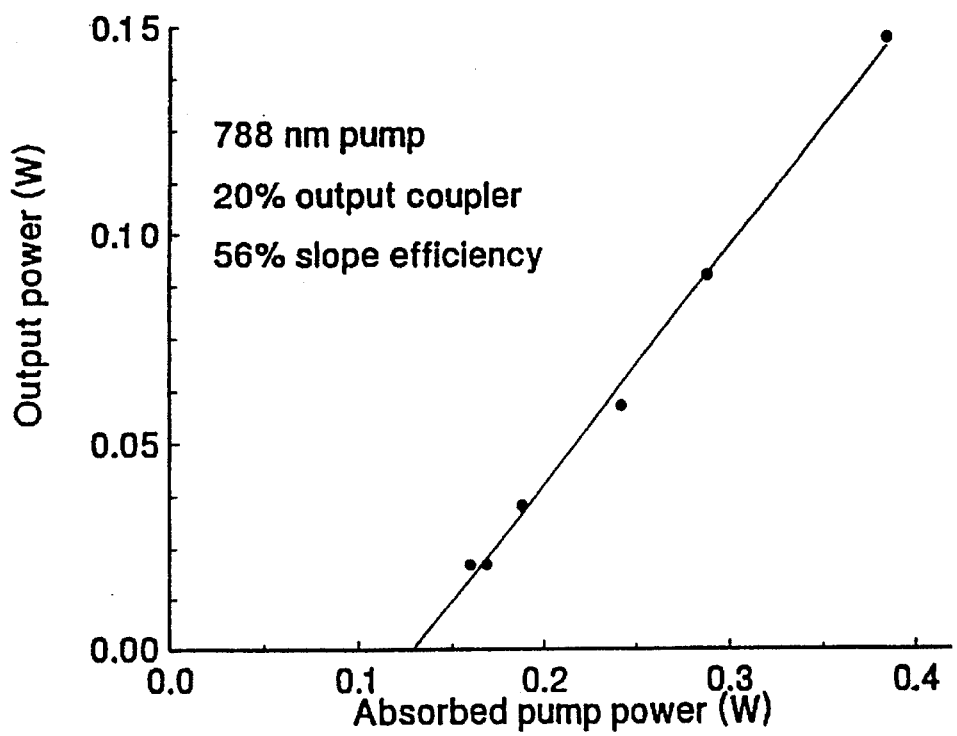
FIG. 7 is a graph of output power as a function of absorbed pump power for 1057 nm lasing using 20% output coupler.

On the other hand, 56% slope efficiency was recorded at 1057 nm when using a 20% output coupler. The pump light wavelength was 788 nm, maximum efficiency was about 74.6%, and the lasing threshold was about 0.1 W of absorbed pump power. See FIG. 7. In this case, the maximum output power was 210 mW.

Figure 8:
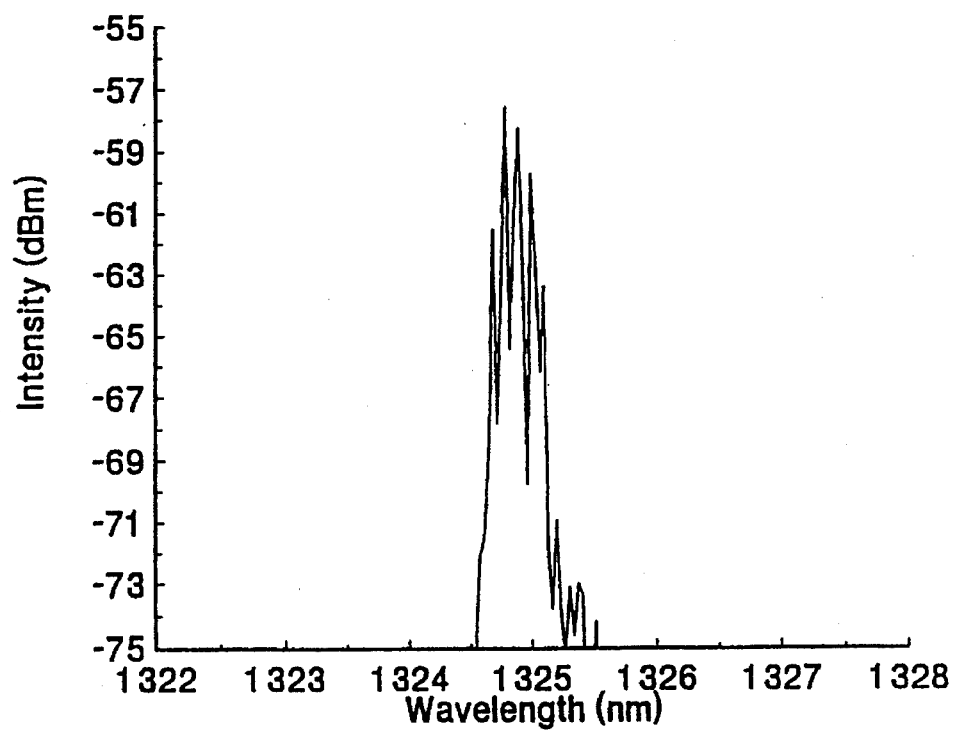
FIG. 8 shows a laser spectrum for the 1325 nm lasing range.

FIG. 8 shows a further laser spectrum for the 1325 nm lasing range. This spectrum was recorded at 200 mW of absorbed pump power at 804 nm.

Figure 9:
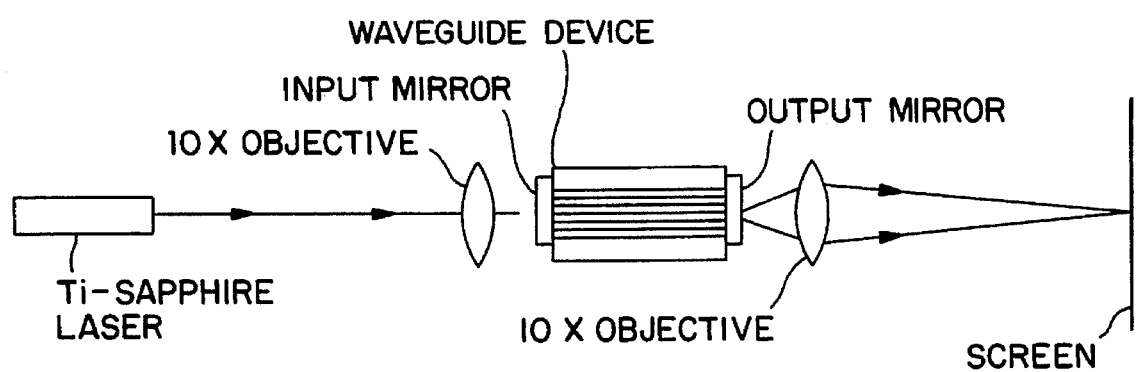
FIG. 9 illustrates a laser waveguide system in accordance with the invention.

FIG. 9 illustrates a laser waveguide system in accordance with the invention. The pump light source is a titanium-sapphire laser and pump light and is focused onto the waveguide inlet region by a 10 X objective. Input and output mirrors are attached to the respective end surfaces of the laser waveguide medium and the laser light exiting the output mirror is focused using a 10 X objective.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A laser waveguide medium comprising:
   a laser glass substrate wherein said substrate is a glass comprising (on an oxide composition basis):

|  | Mole % |
|---|---|
| $P_2O_5$ | 50–70 |
| $Al_2O_3$ | 4–13 |
| $Na_2O$ | 10–35 |
| $La_2O_3$ | 0–6 |
| $Ln_2O_3$ | >0–6 |
| R'O | 0–20 |
| $R_2O$ | 0–18 | wherein $Ln_2O_3$ is the sum of the lanthanide oxides of atomic numbers 58–71, R'O is the sum of oxides of Mg, Ca, Cr, Ba, Zn and Pb, and $R_2O$ is the sum of oxides of Li, K, Rb and Cs; and a waveguide region embedded in said substrate, said waveguide region having a higher refractive index than said substrate and said waveguide region having an inlet region through which light can enter and an outlet region through which light can exit.

2. A waveguide medium according to claim 1, wherein said glass substrate contains 0–10 mole % $R_2O$.

3. A waveguide medium according to claim 1, wherein said substrate is a glass consisting essentially of (on an oxide composition basis):

|  | Mole % |
|---|---|
| $P_2O_5$ | 50–70 |
| $Al_2O_3$ | 4–13 |
| $Na_2O$ | 10–35 |
| $La_2O_3$ | 0–6 |
| $Ln_2O_3$ | >0–6 |
| R'O | 0–20 |
| $R_2O$ | 0–18. |

4. A waveguide medium according to claim 1, wherein said waveguide region is formed by exchanging $Na^+$ ions of said glass substrate with $Ag^+$ ions.

5. A waveguide medium according to claim 4, wheremn the difference in refractive index between said waveguide region and said substrate is 0.04–0.05.

6. A laser waveguide system comprising:
   a laser waveguide medium according to claim 4; and
   a pump light source for introducing pump light emitted from said pump light source into said inlet region of said waveguide region.

7. A waveguide medium according to claim 1, wherein said waveguide region is formed by exchanging $Na^+$ ions of said glass substrate with $K^+$ ions.

8. A waveguide medium according to claim 7, wherein the difference in refractive. index between said waveguide region and said substrate is 0.007–0.01.

9. A laser waveguide system comprising:
   a laser waveguide medium according to
   a laser waveguide medium according to claim 7; and
   a pump light source for introducing pump light emitted from said pump light source into said inlet region of said waveguide region.

10. A waveguide medium according to claim 7, wherein said waveguide operates in single transverse mode.

11. A waveguide medium according to claim 1, wherein said glass substrate has a first end surface in which said inlet region of said waveguide is embedded and a second end surface in which said outlet region of said waveguide is embedded.

12. A waveguide medium according to claim 11, wherein said substrate has a top surface in which said waveguide region is embedded.

13. A waveguide medium according to claim 11, wherein said waveguide further comprises a first mirror attached to said first end surface and a second mirror attached to said second end surface.

14. A waveguide medium according to claim 1, wherein said waveguide region exhibits an attenuation loss value of less than 0.5 dB/cm.

15. A waveguide medium according to claim 1, wheremn said waveguide lases at 905–906 nm, 1055–1058 nm and 1322–1358 nm.

16. A waveguide medium according to claim 1, wherein said glass substrate does not contain polyvalent metal oxides.

17. A waveguide medium according to claim 1, wherein said waveguide operates in multiple transverse modes.

18. A waveguide medium according to claim 1, wherein said waveguide operates in single transverse mode.

19. A waveguide medium according to claim 1, wherein said substrate consists essentially of $Na_2O$, $Al_2O_3$, $La_2O_3$, $Nd_2O_3$ and $P_2O_5$.

20. A waveguide medium according to claim 1, wherein said substrate consists essentially of $Na_2O$, $Al_2O_3$, $La_2O_3$, $Pr_2O_3$ and $O_2O_5$.

21. A waveguide medium according to claim 1, wherein said laser glass substrate is of the following composition:

|  | Weight % |
|---|---|
| $Na_2O$ | 11.93 |
| $Al_2O_3$ | 10.78 |
| $La_2O_3$ | 5.96 |
| $Nd_2O_3$ | 2.05 |
| $P_2O_5$ | 69.28. |

22. A laser waveguide system comprising:
a laser waveguide medium according to claim 1; and
a pump light source for introducing pump light into said inlet region of said waveguide region.

23. A laser waveguide system according to claim 22, wherein said laser waveguide system lasers at about 906 nm.

24. A laser waveguide system according to claim 22, wherein said laser waveguide system lasers at about 1057 nm.

25. A laser waveguide system according to claim 22, wherein said laser waveguide system lasers at about 1325 nm.

26. A laser waveguide system according to claim 22, wherein said laser waveguide system lasers at about 1358 nm.

27. A laser waveguide system according to claim 22, wherein said laser waveguide system lasers at about 1.3 µm.

28. A method of generating laser light at a wavelength of about 906 nm, comprising introducing pump light into the waveguide inlet region of said waveguide medium according to claim 1.

29. A method of generating laser light at a wavelength of about 1358 nm, comprising introducing pump light into the waveguide inlet region of said waveguide medium according to claim 1.

30. A method of generating laser light at a wavelength of about 1057 nm, comprising introducing pump light into the waveguide inlet region of said waveguide medium according to claim 1.

31. A method of generating laser light at a wavelength of about 1.3 µm, comprising introducing pump light into the waveguide inlet region of said waveguide medium according to claim 1.

32. A waveguide medium according to claim 1, wherein said waveguide region is formed by subjecting said laser glass substrate to electrical field-assisted $Ag^+/Na^+$ ion exchange, whereby $ag^+$ ions are exchanged for $Na^+$ ions of said substrate.

33. A waveguide medium according to claim 1, wherein said waveguide region is formed by immersing said laser glass substrate in a molten bath, whereby ions in said molten bath are exchanged for $Na^+$ ions of said substrate.

34. A waveguide medium according to claim 33, wherein $K^+$ ions in said molten bath are exchanged for $Na^+$ ions of said substrate.

35. A waveguide medium according to claim 1, wherein said glass contains 0.01–6 mole % $Er_2O_3$.

36. A waveguide medium according to claim 35, wherein said glass contains 0.01–3 mole % $Er_2O_3$.

37. A waveguide medium according to claim 1, wherein said glass contains 0.01–6 mole % $Nd_2O_3$.

* * * * *